Patented June 10, 1952

2,599,817

UNITED STATES PATENT OFFICE 2,599,817

CARBO-POLYMERIZATION HOMOPOLYMERS OF UNSATURATED ALCOHOL ETHERS OF GLYCIDOLS AND THEIR HOMOLOGS

Theodore W. Evans and Edward C. Shokal, Oakland, Calif., assignors to Shell Development Company, San Francisco, Calif., a corporation of Delaware No Drawing. Application January 12, 1948, Serial No. 1,894

4 Claims. (Cl. 260—88.3)

1

This invention relates to the carbo-polymerization polymers of unsaturated alcohol ethers of the glycidols and their homologs and to a method of preparing such polymers. More particularly, the invention provides a method of polymerizing unsaturated glycidyl ethers via the particular subclass of addition-polymerization reactions known as carbo-polymerization, i. e., a polymerization reaction by which each unit of the polymolecule is joined by carbon-to-carbon linkages, and provides the novel poly(unsaturated alcohol ether of glycidol) so produced.

The present application is a continuation-in-part of our copending application No. 513,298, filed December 7, 1943, now Patent No. 2,450,234, which describes and claims polymers of unsaturated alcohol ethers of glycidols in which the polymer units are joined by carbon-to-oxygen linkages and a method for their production by an oxy-polymerization reaction between epoxide and hydroxyl groups.

The polymeric materials provided by the present invention predominate in linear chain-like molecules composed of saturated carbon atoms every second one of which bears a 1,3- or a 2,3-glycidyloxy radical

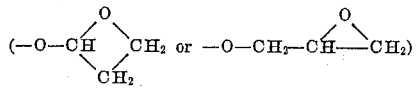

The invention includes such polymers containing the homologs of the glycidyloxy radicals in which a lower alkyl radical (such as a methyl, ethyl or propyl radical) replaces one or more of the hydrogen atoms of the glycidyloxy radicals depicted above. As a matter of convenience in language, throughout the specification the term "glycidyl" will be employed to refer generically to the unsubstituted glycidyl radicals and their homologs of the group indicated above.

The compounds of the invention are prepared by polymerizing, in the manner described below, the glycidyl ethers of unsaturated aliphatic alcohols. Such ethers preferably contain an unsaturated aliphatic carbon atom (a carbon atom joined in the molecule by an olefinic or acetylinic linkage) in the 2-position of the alcoholic residue. The particularly preferred ethers are the 2,3-glycidyl ethers of aliphatic allylic and vinylic alcohols, i. e., alkenyl 2,3-glycidyl ethers in which the olefinic double bond is directly attached to the second carbon atom of the alkenyl radical.

Illustrative examples of the general class of glycidyl ethers of unsaturated aliphatic alcohols

2 which may be employed in the present process include, allyl 1,3-glycidyl ether, vinyl 2,3-glycidyl ether, allyl 2,3-glycidyl ether, crotyl 2,3-epoxybutyl ether, 1-butenyl 1-methyl-1,3-epoxypropyl ether, 2-methyl-1-hexenyl 2-ethyl-2,3-epoxypropyl ether, 2-methyl-2-hexynyl 2,3-glycidyl ether, propargyl 2,3-glycidyl ether, 4-methyl-2-pentynyl 2,3-glycidyl ether, secondary-butenyl 1,3-glycidyl ether, tertiary-butenyl 2,3-glycidyl ether, 3-butyl-2-dodecyl 2,3-epoxyhexyl ether, 2-pentacosyl 2,3-glycidyl ether, 2-methyl-1-tetracosyl 2,3-glycidyl ether, 1-methyl-2-heptenyl 2,3-glycidyl ether, 1,1-dimethyl-2-octenyl 2,3-glycidyl ether, 1-ethyl-1-methyl-2-heptenyl 2,3-glycidyl ether, 1-propyl-2-heptenyl 2,3-glycidyl ether, and the like.

The glycidyl ethers of aliphatic allylic alcohols are a preferred subclass of the above class of ethers which contain an olefinic double bond and an oxygen atom in the structural arrangement (—O—C—C=C). Examples of ethers of this subclass include, allyl 2,3-glycidyl ether, methallyl 2,3-glycidyl ether, 1-ethyl-2-propenyl 2,3-glycidyl ether, crotyl 2,3-glycidyl ether, tiglyl 2,3-glycidyl ether, and the like. Such ethers containing a terminal methylene group, i. e., the 2-methylidenealkanyl glycidyl ethers, as for example, allyl 2,3-glycidyl ether, ethallyl 2,3-glycidyl ether and like, have been found to be particularly active in the formation of the polymers of the invention.

The glycidyl ethers of aliphatic vinylic alcohols are a sub-class of the above general class of ethers which contain an olefinic double bond and an oxygen atom in the structural arrangement (—O—C=C). Examples of ethers of this subclass include, vinyl 2,3-glycidyl ether, isopropenyl 1,3-glycidyl ether, 1-methylidenepentyl 1,3-glycidyl ether, 1-heptenyl 2,3-glycidyl ether and the like. Of such ethers those containing a terminal methylene group, i. e., the 1-methylidenealkanyl glycidyl ethers, as for example vinyl 2,3-glycidyl ether, 1-methylidenebutyl 2,3-glycidyl ether and the like, have been found to be particularly active in the formation of the polymers of the invention.

In view of the cost and availability of high molecular weight organic compounds (compounds containing large numbers of carbon atoms) as compared to their lower homologs, as well as the decreasing polymerizability of aliphatic multiple linkages in compounds containing large numbers of carbon atoms it is preferable to employ ethers of the above general class containing not more than about 18 carbon atoms per molecule in the present process.

The glycidyl ethers of unsaturated alcohols each contain two polymerizable groups, an acetylinic (C≡C) or olefinic (C=C) carbon-to-carbon unsaturated linkage, as well as an epoxide group

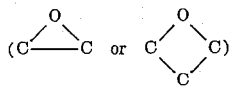

The polymerization of carbon-to-carbon unsaturated linkages produces linear chains of carbon atoms while polymerization through the epoxide groups forms linear chains which are groups of carbon atoms connected by intermediate oxygen atoms. It is therefore possible to form from these ethers products which are composed of substituted ethylene groups, which are composed of substituted oxyalkylene groups, or which are composed of any intermediate mixture of the two types of structural units by varying the reaction conditions to favor the polymerization of one or the other or both polymerizable groups.

Increasing the reaction temperature increases the rate of both the oxy-polymerization reaction (the polymerization of the epoxide groups) and the carbo-polymerization reaction (the polymerization of the unsaturated linkages). At a given elevated temperature in the presence of acidic or basic reactive compounds or in the presence of a substantial amount of an inert organic solvent, the oxy-polymerization reaction described in our copending application No. 513,298 predominates. In the absence of the above materials and in the presence of carbo-polymerization catalysts such as organic peroxides, perborates, persulfates, actinic light, oxygen, and the like, the carbo-polymerization reaction predominates.

The particularly preferred method of producing predominately carbon-to-carbon linked polymers comprises the oxygen catalyzed polymerization of the above defined ethers at temperatures between about 50° C. and 300° C. A particularly economical means of accomplishing the reaction comprises maintaining the ether (in the absence of the oxypolymerization reaction catalysts mentioned above) at between about 50° to 200° C. or at the reflux temperature of the ether under atmospheric pressure, while aerating it with oxygen, which is most conveniently and economically introduced in the form of normal air. Where it is practical or desirable to employ higher temperatures the reaction may be conducted in greater than atmospheric pressure systems with or without continuous introduction of oxygen or other carbo-polymerization catalysts.

Alternatively, predominately carbon-to-carbon linked polymers may be produced by polymerizing the above defined ethers at temperatures between about 50° C. and 300° C. in the presence of an organic peroxide. Diacyl or dialkyl peroxides as well as acyl or alkyl hydroperoxides, peresters, diperoxides and the like may suitably be employed. In such employment peroxides in which the peroxide oxygen atoms are directly attached to one or more tertiary-alkyl radicals are particularly advantageous by virtue of their relative stability to impact and to the conditions of storage and handling in general. The amount of peroxide required for the polymerization reactions may be varied over relatively wide limits, but in general increasing the amount of organic peroxide above about 5% based on the weight of the ether becomes relatively uneconomical. Illustrative examples of organic peroxides suitable for employment in the process include, di-tertiary-butyl peroxide, di-tertiary-amyl peroxide, tertiary-butyl tertiary-amyl peroxide, tertiary-butyl hydroperoxide, benzoyl peroxide, 2,2-bis(tertiary-butyl-peroxy)propane, tertiary-amyl hydroperoxide, acetyl peroxide, acetone peroxide, methyl n-propyl butane peroxide, dicyclohexyl peroxide and the like.

The polymers prepared in the above manner in the presence of the carbo-polymerization catalysts and in the absence of the oxy-polymerization catalysts have a relatively high solubility and are fusible. These properties may be greatly modified by the application of conditions favoring oxy-polymerization either during the polymerization reaction, or before or after applying, or molding the composition for its desired application.

The infusibilization or cross-linking of the linear polymers prepared as above is preferably accomplished in the presence of a catalyst, and Friedel-Crafts catalysts are particularly effective. Examples of Friedel-Crafts type catalysts are aluminum chloride, aluminum bromide, antimony pentachloride, ferric chloride, stannic chloride, boron trifluoride, complexes formed by boron trifluoride with alcohols, esters and the like, zinc chloride, etc. Stannic chloride and antimony pentachloride are preferred. From about 0.01% to 1% of a Friedel-Crafts catalyst is usually satisfactory. Ordinarily, however, the reaction can be carried out at room temperature or above, the upper limit of temperature being dependent principally upon the decomposition or degradation of the reactants or products. The reaction mixture should be substantially anhydrous where Friedel-Crafts catalysts are used. Other kinds of catalysts which are effective are alkali metal hydroxides, alkali metal oxides and organic bases, such as amines, diamines and the like.

The carbo-polymerization polymers can be infusibilized in bulk, as solutions in ethers having solvent properties, or as dispersions which may be permanent emulsions or suspensions. Emulsifying agents, granulating agents, wetting agents, etc., can be present. Infusibilization can sometimes be accomplished by atomizing the ethers, or a solution thereof, in the form of a fine spray into a heated chamber containing an inert gas. Sometimes it is desirable to infusibilize the allylic alcohol ethers of glycidols in the form of a thin sheet which may be subsequently stripped from the surface to which it was applied or left on the surface in the form of a coating. The ethers can be used to impregnate fabric and can then be infusibilized while held dispersed in the interstices thereof. Infusibilization may be continuous or discontinuous, and may be conducted at atmospheric, superatmospheric or reduced pressure.

The polymers prepared in accordance with the invention can be infusibilized individually or in admixture with one another, or with other modifying substances. Examples of modifying substances which may be used are solvents, swelling agents, plasticizers, dyes, pigments and fillers. Others are drying and semi-drying oils such as soy, linseed, perilla, fish, tung, sunflower, oiticica, and dehydrated castor oil. Non-drying oils which may be employed are cottonseed, cocoanut and castor oils; oils obtainable by the hydrolysis of the foregoing oils; protein plastics; cellulose derivatives such as cellulose nitrate, cellulose acetate, cellulose acetobutyrate, ethyl cellulose, etc; natural resins such a gilsonite, rosin, colophony, shellac, copal, dammar gum, pitch and asphalt; and synthetic plastics. An important group of synthetic resins with which the polymers may be infusibilized comprises thermosetting resins. Of these some are of the condensation type such as phenol formaldehyde, urea formaldehyde, and some alkyds. Another important group of synthetic resins which can be infusibilized with the polymers are those having two or more polymerizable unsaturated carbon-to-carbon linkages unconjugated with respect to carbon. Examples are the unsaturated polyesters of saturated polycarboxylic acids such as vinyl, allyl and methallyl esters of oxalic, malonic, succinic, glutaric, adipic, sebasic, citric, tartaric, phthalic, isophthalic and naphthalene dicarboxylic acids; unsaturated polyesters of polybasic inorganic acids such as vinyl, allyl, methallyl, cyclohexenyl esters of the ortho acids of silicon and boron and the corresponding esters of sulfuric and phosphoric acids; unsaturated carboxylic acid polyesters of unsaturated polyhydric alcohols such as acrylic and methacrylic polyesters of glycol, diethylene glycol, triethylene glycol, trimethylene glycol, glycerol, etc.; unsaturated polyethers of polyhydric alcohols such as vinyl, allyl and methallyl polyethers of glycol, diethylene glycol, triethylene glycol, trimethylene glycol, glycerol, etc.; ethers having two or more unsaturated aliphatic radicals such as vinyl, allyl, methallyl and crotyl diethers; unsaturated acids such as vinyl, allyl and methallyl esters of acrylic and methacrylic acids. Among the thermoplastic synthetic plastics which may be infusibilized with the polymers are many of the alkyd-type resins, superpolyamides, superpolyester-amides and polymers of polymerizable organic compounds having a single polymerizable unsaturated carbon-to-carbon linkage in the molecule, examples of which are unsaturated esters of saturated monobasic acids such as vinyl, allyl and methallyl esters of acetic, propionic, butyric, etc., acids, saturated esters of unsaturated monobasic acids such as methyl, ethyl, propyl, etc., esters of acrylic and methacrylic acids; styrene; alpha-methyl styrene; ethylene; vinyl halides; vinylidene halides; allyl alcohol; allyl halides, etc. Another group of plastics consists of synthetic rubbers, particularly those formed by the polymerization and copolymerization of conjugated butadiene, the conjugated pentadienes, the conjugated hexadienes, etc.

These and other synthetic plastics can be present as such during the infusibilization of the carbo-polymerization polymers. However, if desired there may be used instead of the plastics themselves substances capable of forming the plastics. For instance, monomers instead of polymers of polymerizable unsaturated organic compounds, where present during infusibilization, often undergo polymerization and may become chemically involved with the carbo-polymerization polymers.

The following detailed examples illustrate the process of the invention as applied to individual unsaturated alcohol ethers of the glycidols. The invention is not, however, limited to the particular reactants or reaction conditions recited in the examples.

*Example I.—Air catalyzed continuous carbo-polymerization*

Allyl glycidyl ether was refluxed at 155° C. under normal atmospheric pressure for 48 hours while being continuously aerated with the air of the atmosphere. The refractive index of the solution was found to be $n_D^{20}$ 1.4990 or an increase of $n_D^{20}$ 0.0412 corresponding to a 48% conversion to polymer. The product was a viscous liquid with a light coloration (Gardner color 9–10) having a viscosity of about 27.0 poises at 25° C.

*Example II.—Air catalyzed intermittent carbo-polymerization*

Allyl glycidyl ether was intermittently refluxed at 155° C. while aerated as above and allowed to stand without heating. The total heating and aerating time amounted to 40 hours. The refractive index of the solution was found to have increased by $n_D^{20}$ 0.0412 corresponding to a 53% conversion to a liquid polymer having had a color of about one third greater intensity than the polymer of Example I (Gardner color 11–12) and a viscosity between 148 and 388 poises at 25° C. The carbo-polymer of allyl glycidyl ether would theoretically have an epoxide value of 0.88 equivalents per 100 grams. The poly(allyl glycidyl ether) reaction product was found to have 0.50 epoxide equivalents per 100 grams indicating that well over half of the epoxide groups remained unconverted during the polymerization reaction.

*Example III.—Alkyl hydroperoxide initiated polymerization*

Allyl glycidyl ether in the presence of 2% by weight tertiary-butyl hydroperoxide was heated for 5.2 hours at 200° C. in a closed reaction vessel. The refractive index increased by $n_D^{20}$ 0.0093 indicating a 19% conversion to a very slightly colored (Gardner color 9–10) polymer having a refractive index $n_D^{20}$ 1.4920 and a viscosity of about 3.5 to 4.0 poises at 25° C. The polymer was found to have an epoxide value of 0.66 equivalents per 100 grams indicating a conversion of less than ¼ of the epoxide groups.

A second polymerization conducted in the same manner but employing 3% by weight of tertiary-butyl hydroperoxide resulted in the conversion of 24% of the monomer to the polymer in only 5 hours.

*Example IV.—Dialkyl peroxide initiated polymerization*

Allyl glycidyl ether polymerized in the manner employed in Example III in the presence of 3% di-tertiary-butyl peroxide produced a substantially clear viscous polymer in an 18% conversion in 5 hours.

*Example V.—Actinic light initiated polymerization*

Allyl glycidyl ether in the presence of 1% by weight of benzoin was placed approximately 6 inches from a light producing principally actinic radiations. As indicated by the rise in the refractive index of the solution polymerization occurred during an exposure of 110 hours.

We claim as our invention:

1. A polymerization process for producing a fusible homopolymer which comprises polymerizing an alkenyl monoether of a glycidol of the group consisting of 2,3-glycidol, 1,3-glycidol and the homologs of such glycidols containing not more than 6 carbon atoms by heating said ether as sole polymerizable compound in liquid phase at a temperature of 50° C. to 300° C. in the presence of a polymerization catalyst containing two oxygen atoms joined by an oxygen-to-oxygen bond whereby fusible homopolymer is obtained containing epoxide groups.

2. The fusible homopolymer obtained by the process defined in claim 1, which homopolymer contains epoxide groups.

3. A polymerization process for producing a fusible homopolymer which comprises polymerizing allyl glycidyl monoether by heating said ether as sole polymerizable compound in liquid phase at a temperature of 50° C. to 300° C. while aerating said ether with molecular-oxygen gas.

4. A polymerization process for producing a fusible homopolymer which comprises polymerizing allyl glycidyl monoether by heating said ether as sole polymerizable compound in liquid phase at a temperature of 100° C. to 300° C. in the presence of a catalytic amount of di-tertiary-butyl peroxide.

THEODORE W. EVANS.
EDWARD C. SHOKAL.

REFERENCES CITED

The following references are of record in the file of this patent:

UNITED STATES PATENTS

| Number | Name | Date |
| --- | --- | --- |
| 2,160,943 | Britton et al. | June 6, 1939 |
| 2,370,562 | Meunier | Feb. 27, 1945 |
| 2,450,234 | Evans et al. | Sept. 28, 1948 |
| 2,464,753 | Shokal et al. | Mar. 15, 1949 |
| 2,470,324 | Staudinger et al. | May 17, 1949 |